United States Patent [19]

Mestdagh

[11] 4,127,883
[45] Nov. 28, 1978

[54] SUPPORTING MECHANISM FOR MAGNETIC TAPE RECORDER

[75] Inventor: Gilbert E. Mestdagh, Eindhoven, Netherlands

[73] Assignee: U.S. Philips Corporation, New York, N.Y.

[21] Appl. No.: 805,965

[22] Filed: Jun. 13, 1977

[30] Foreign Application Priority Data

Jun. 21, 1976 [NL] Netherlands .......................... 7606690

[51] Int. Cl.² .............................................. G11B 5/54
[52] U.S. Cl. ........................................ 360/105; 360/96
[58] Field of Search ........................ 360/95, 93, 96, 69, 360/105, 132

[56] References Cited

U.S. PATENT DOCUMENTS

| | | | |
|---|---|---|---|
| 3,747,941 | 7/1973 | van der Lely | 360/105 |
| 3,843,847 | 10/1974 | Sato | 360/105 |
| 3,864,745 | 2/1975 | Platt | 360/105 |
| 3,893,186 | 7/1975 | Yoshii | 360/105 |
| 3,996,618 | 12/1976 | Suzuki | 360/105 |

Primary Examiner—John H. Wolff
Attorney, Agent, or Firm—Frank R. Trifari; David R. Treacy

[57] ABSTRACT

A tape recording and/or playback apparatus having a cassette support positioned vertically by the magnetic head holder. The support is movable with the magnetic head unit in two transverse directions, one in which the heads are inserted in or retracted from the operative position, and the other in which the holder may be latched or unlatched so as to permit the support and magnetic head unit to move into the operating position.

16 Claims, 5 Drawing Figures

SUPPORTING MECHANISM FOR MAGNETIC TAPE RECORDER

BACKGROUND OF THE INVENTION

1. Field of the Invention

The invention relates to a cassette handling apparatus for recording and/or playback of signals on magnetic tape contained in a cassette (hereinafter referred to simply as a cassette recorder); and more particular to a cassette recorder having a magnetic head unit which is movable with respect to the housing between an operating position and a retracted position, the latter allowing insertion or removal of a cassette; and a cassette support adapted to position the cassette in a direction transverse to the direction of tape transport past the head, in the plane of the tape.

The most widely used type of magnetic tape cassette for quality reproduction has two hubs placed side-by-side with the magnetic tape wound around and passing between them. One particular design of cassette of this general type has come into predominant use for entertainment purposes, and is also used in some dictation applications. This cassette, which is depicted for example in U.S. Pat. No. 3,396,899 is commonly called the "Compact Cassette." Although it can be manufactured relatively inexpensively, it has a fairly rigid housing structure which permits good alignment of the tape with regard to the outer surfaces of the flat housing in which the tape and two hubs are contained. The tape passes an opening in a long or front wall of the housing, through which opening the magnetic heads are inserted to engage the tape and a pressure roller is inserted to press the tape against a capstan that extends up through a hole in the bottom wall of the cassette. Drive spindles for the two hubs also project up through openings in the bottom wall of the cassette. Thus in order to locate the cassette on a playing apparatus, there must be motion with respect to operational parts of the apparatus in two directions, first to pass the spindles and capstan through their openings into position, and then transversely so that the heads and pressure roller may engage the tape.

Tape cassettes for audio entertainment use were originally intended for low priced magnetic tape equipment, whose performance was less than that of the so-called reel-to-reel recorders. However, because the separate magnetic tape reels of the reel-to-reel machines could not be placed on the apparatus in a single motion, the development of the magnetic tape cassette was intended to make magnetic tape equipment more popular and available at a lower price. Moreover, because of the suitability of the cassette recorders for portable use, more early cassette recorders had inexpensive electronic components and circuits and small loudspeakers that could not provide audio performance equivalent to the higher rated equipment. Although recently cassette recorders are now produced for the higher price and performance ranges, and maintain the desirable convenience of handling and in some cases may comply with hi-fi standards, as a product the small portable cassette recorder is still eminently suited for the lower price range in which the cost of materials and assembly time become very important.

2. Description of the Prior Art

In order to position the compact cassette or similar cassettes sufficiently accurately in a tape apparatus, so that the head will have proper engagement with the narrow track of information recorded along the tape, known tape deck mechanisms have made extensive use of metal components, such as a metal base plate and a metal head holder. Because of weight and cost considerations, portable cassette recorders almost always use a plastic housing; more recently, in order to reduce cost tape deck mechanisms making considerable use of plastic materials and parts have been introduced, and some units have been proposed which would even use a plastic head holder. However, in general this construction has involved the replacement of metal parts by plastic parts, so that in effect the conventional metal deck mechanisms have been "translated" into plastic (for example, British patent specification No. 1,401,740).

The known plastic mechanisms have used plastics of good availability and low price, which plastics unfortunately have a lower strength, a much lower modulus of elasticity, a greater temperature dependence of the modulus of elasticity, and much lower dimensional stability than the metal parts that are replaced. Successful production of a good quality recorder with plastic parts in place of metal has required comparatively expensive, stable plastics, which could only be processed by those manufacturers having great experience in the field of plastics.

Although it has been recognized that in the use of a plastic deck mechanism, accurate relative positioning of the magnetic heads, capstan and pressure roller is required for accurate transport of the comparatively narrow magnetic tape, achieving this goal using part designs which are the same as that of the previous metal parts has made it difficult to provide a recorder whose reproduced sound meets reasonable quality standards with a high reliability of long operating life. Moreover, inability to guide the tape accurately can damage the tape in the cassette, and in some cases may even render the tape cassette completely useless.

Another facet of cassette recorder design has revolved around the convenience of handling. Particularly suited for use in automobiles, cassette recorders such as that described in U.S. Pat. No. 3,747,941 do not require manual actuation of a "Play" button in order to move the magnetic head unit into the operating position and to energize the transport drive motor and the electronic circuitry. This has been particularly advantageous where operation should demand a minimum of attention from the user, for example the automobile driver. In such a recorder a spring or other device will bias the head holder towards its operating position; and an actuating means is provided for manually moving the head holder against the action of the previously mentioned spring from the operating to a more retracted position, in which a locking means will lock the head holder so retracted. The locking means and unlocking means utilize a second spring or resilient device and a movable unlocking member biased by the second spring, the unlocking member being affected by the exertion of manual pressure on the cassette.

In a previously known cassette recorder of this general type, the locking means utilizes a small pin which projects upward through the base of the apparatus. After placing the cassette on the apparatus, pressure is exerted on the front of the cassette, that is, the edge near the magnetic heads, and the head holder is released from its locked position and is moved to the operating position by the first spring. To turn off the equipment, manual pressure on two interlocked push buttons disposed one to each side of the apparatus is required, so that the head holder is returned to its more retracted position and at the same time the pin moves upward thereby pushing the cassette up.

SUMMARY OF THE INVENTION

An object of the invention is to provide a cassette recorder which will assure correct positioning of the magnetic tape, in particular relative to a playback head (as used hereinafter, this term is intended to include a head used for recording only, or for both recording and playback), having a deck mechanism which may successfully be made substantially all from plastic molded parts. A further object of the invention is to provide a simple, reliable mechanism for moving a magnetic head unit from a locked position to an operating position and for moving the magnetic head unit back to the locked position and releasing the cassette in response to a simple manual movement, without need for additional moving parts or precise components.

According to the invention a tape cassette recorder has a magnetic head unit which is movable with respect to an inserted cassette's location both in a first direction between retracted and operating positions so arranged that, when the unit is in a retracted position, the cassette may readily be removed from or loaded into the apparatus, and in a second direction transverse to the first direction for latching the unit or for sensing the insertion of a cassette so as to unlatch and permit the head unit automatically to move into the engaged position; and a movable cassette supporting means whose position, when the magnetic head unit is in operating position for engaging tape, is determined directly by the magnetic head unit.

This inventive construction provides the advantage that the position of a cassette placed on the apparatus is, during operation, directly related to the position of the magnetic head unit, so that it is no longer necessary that the magnetic head unit be accurately guided relative to other parts of the apparatus such as a base plate or a housing. This permits the use of relatively less stable plastic materials for the housing parts and the magnetic head holder; or in the event of the use of metal, eliminates the need for precision guides such as steel balls for positioning the head holder with respect to the housing.

According to a preferred embodiment of the invention, in order to avoid subjecting the magnetic recording or playback head to a mechanical load, the movable cassette supporting means comprises a movable cassette support whose position is determined by the position of the head holder itself. Preferably, the movable cassette supporting means is rigidly connected to the head holder, and is most advantageously formed as an integral portion of that holder arranged in the immediate vicinity of the playback head. Two additional cassette supports are stationary and are located on a base plate of the tape deck mechanism or a housing of the recorder apparatus, so that during operation the cassette is positioned in a vertical direction by three points — one being close to and responsive to the position of the recording and/or playback head.

In a further preferred embodiment of the invention in the operating position the magnetic head unit holder is positioned against stationary stops so that accurate positioning of the head unit can be obtained without the need for accurate guiding of the head unit when it is not in the operating position. Advantageously, the stationary cassette supporting means and the stationary stops for the head holder are formed integrally as part of one housing section of the apparatus, respective supporting surfaces and stop surfaces being formed by molding so that accurate relative positioning may be maintained without the need for extreme stability in the housing material. This advantage follows from the fact that the injection molds are normally manufactured with high precision. In the preferred construction, the housing section includes a cassette compartment whose bottom wall has supporting surfaces and stationary holder stops molded on opposite sides of the bottom wall.

According to a still further preferred embodiment of the invention, at least one movable cassette support also functions as an unlocking member to permit the head holder to move from the retracted to the operating position without further manipulation by a person who has loaded the cassette into the recorder. The complete head holder while in its retracted position is movable from an unlocked position to a locked or rest position against a spring force; and a second spring biases the head holder from the retracted position toward the operating position. Advantageously, these two motions are provided as pivoting motions about one pivot bearing arrangement which permits small angular movements about two axes perpendicular to each other. This provides the cost and manufacturing advantage that such a bearing may be an apparently poor quality bearing having considerable play. Particularly with apparatus designed for use in automobiles, by having a cassette support perform a double function, providing a separate actuating member for switching on the recorder may be eliminated, and "one hand" insertion and turn-on can be provided while still obtaining accurate positioning of the cassette in a low cost apparatus.

BRIEF DESCRIPTION OF THE DRAWING

The invention will now be described in more detail with reference to the drawing, in which.

DESCRIPTION OF THE PREFERRED EMBODIMENT

Cassette and Magnetic Head Positioning

Figure 1:
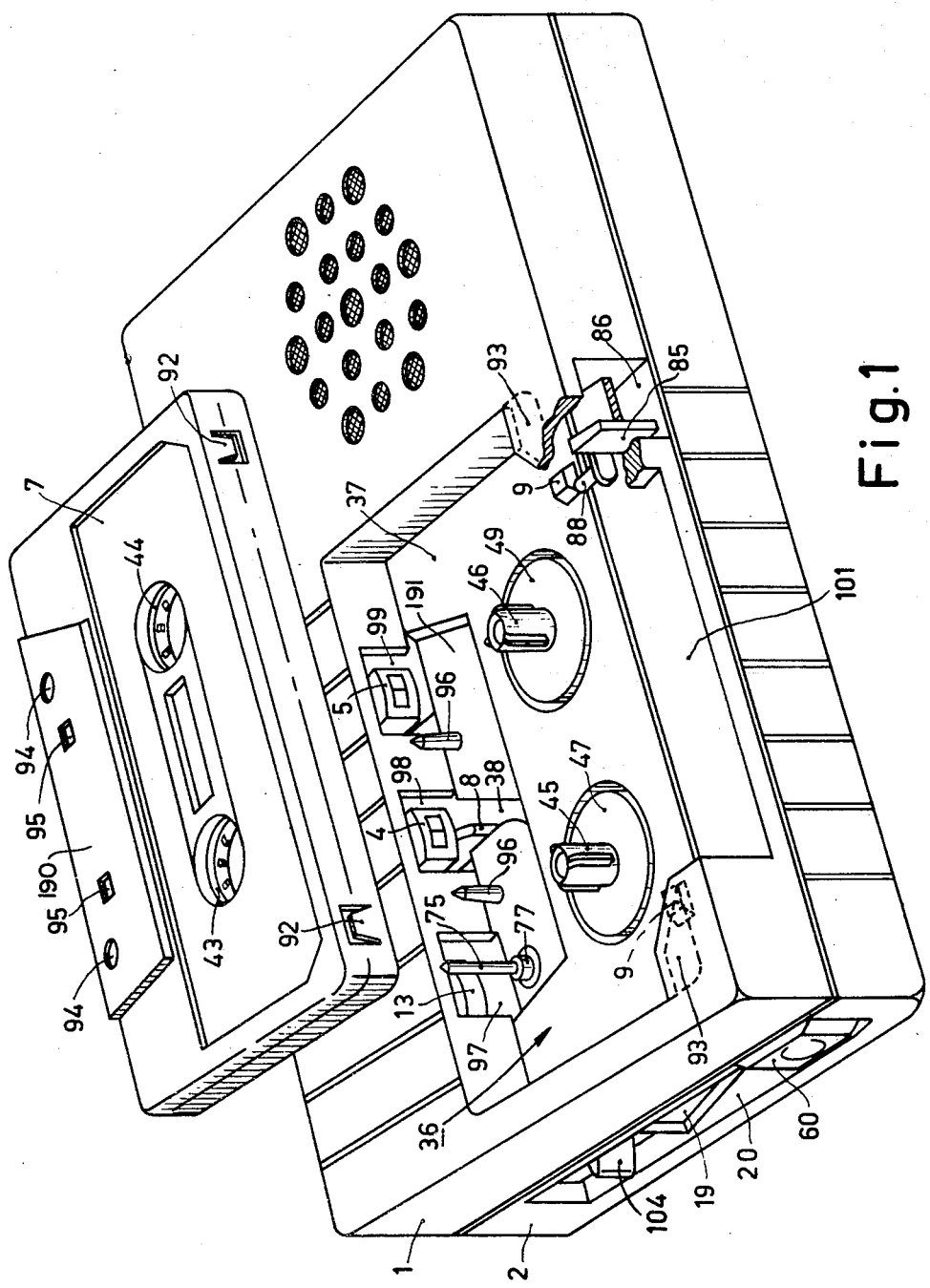
FIG. 1 is a perspective view of a small portable cassette recorder in accordance with the invention, and its associated cassette.

A cassette recorder according to the preferred embodiment shown generally in FIG. 1 has a housing formed from upper and lower housing sections 1 and 2 each integrally formed from a molded plastic. Mounted movable in this housing is a magnetic head unit 3, shown in detail in FIG. 5, having a magnetic head 4 for recording and playback and an erase head 5 for erasing, mounted on a molded plastic holder 6, only the two magnetic heads being visible in FIG. 1. The holder 6 and the magnetic heads are arranged to be movable from a retracted position shown in FIG. 1 into an operating position in which the heads can magnetically engage magnetic tape in a cassette 7. When the holder 6 is in the retracted position the cassette can be placed on/or removed from the recorder without interference by the heads 4, 5.

Also visible in FIG. 1 is a cassette support 8, formed as a rigid part of the head holder 6. Preferably, this support is located in the immediate vicinity of the recording/reproducing head 4. During operation the cassette 7 is positioned vertically by bearing on the movable cassette support 8 and on two stationary cassette supports 9 formed as a part of the upper assembly 1. The position of the cassette 7 relative to the magnetic heads 4, 5 during operation is therefore at least partly determined by the position of the unit 3.

Figure 2:
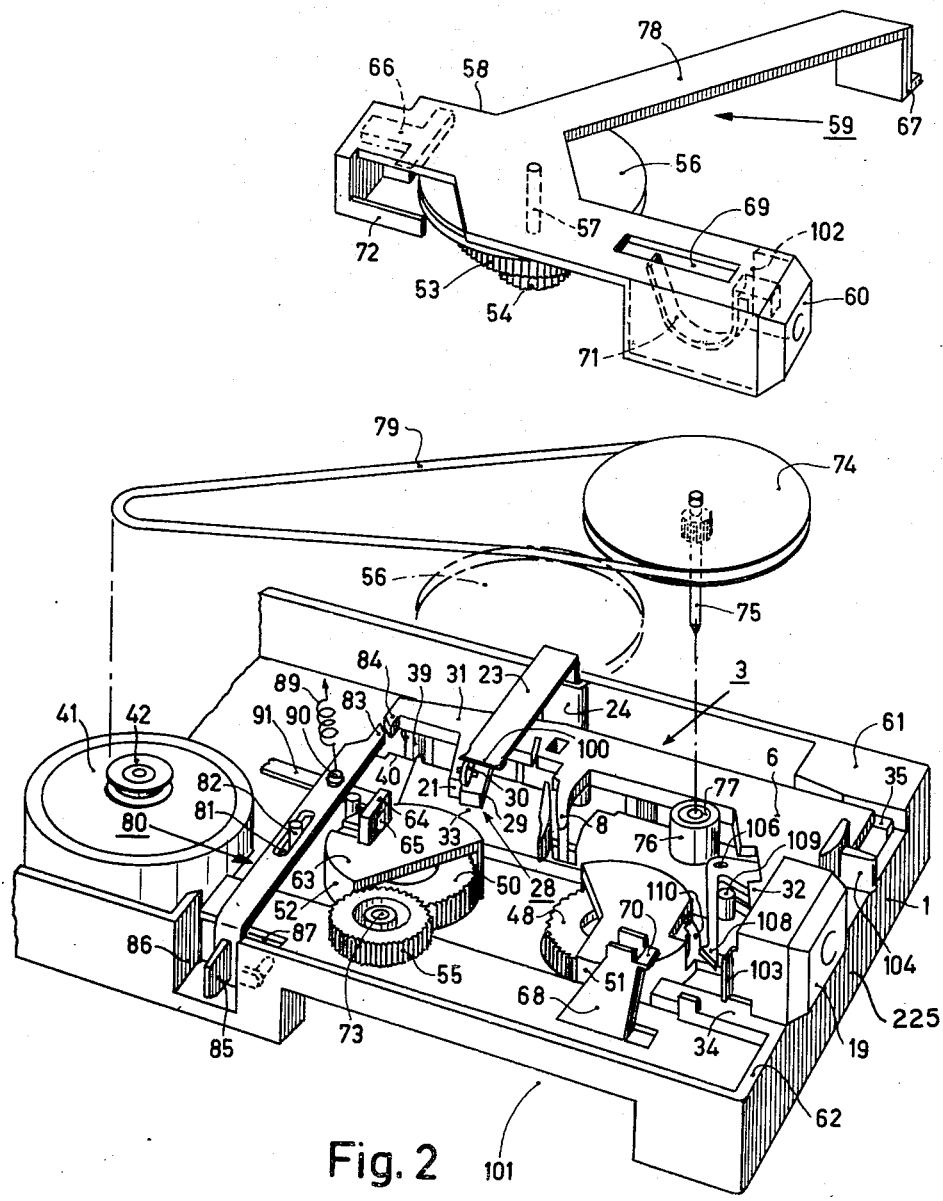
FIG. 2 is an exploded perspective view, from underneath, of the upper section of the housing of the embodiment of FIG. 1.
Figure 3:
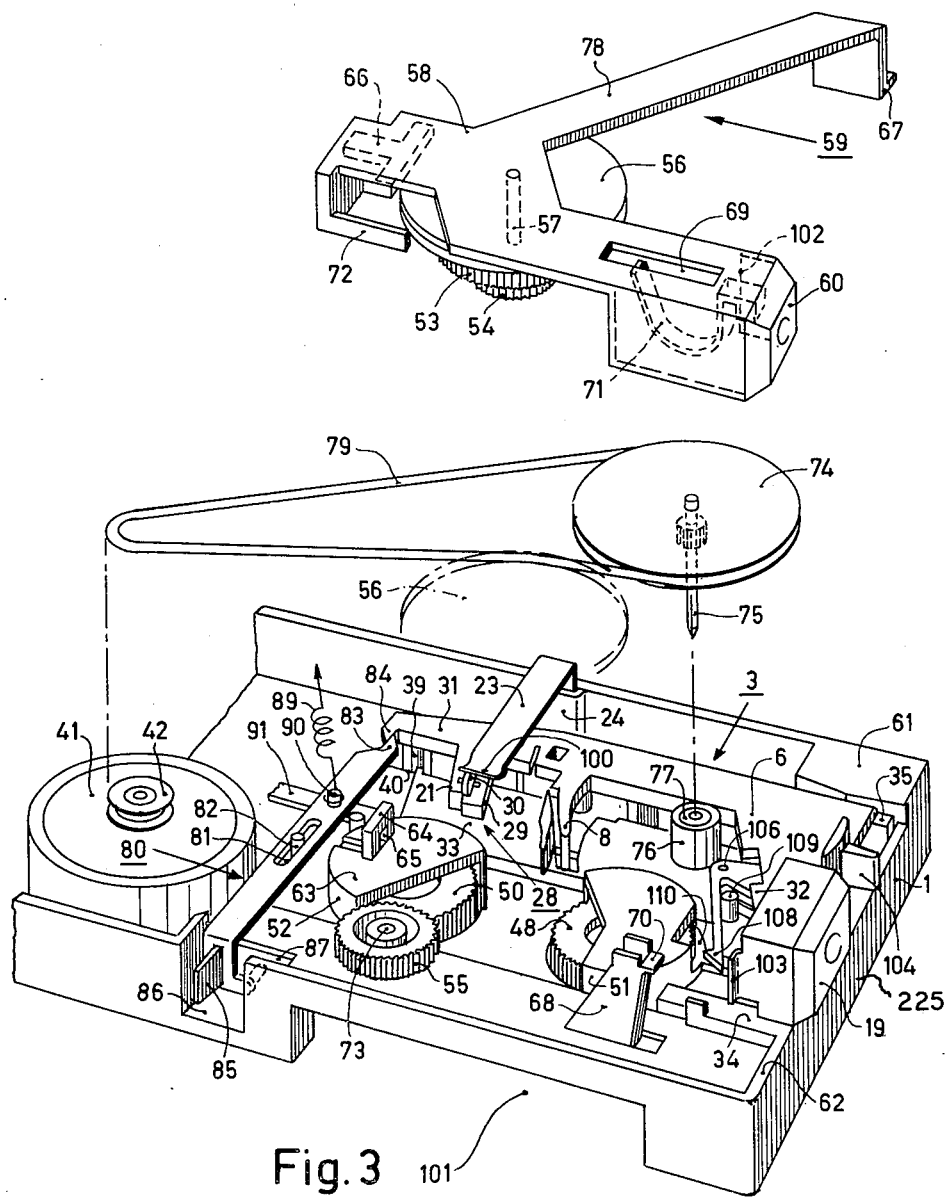
FIG. 3 is an exploded perspective view as in FIG. 2 but showing the recording-switching member in the recording position.

In FIGS. 2 and 3 the magnetic head unit 3 is shown in its operating position. The head holder is continually biased toward its operating position by a spring 11 located above the holder 6 and therefore hidden from view in FIGS. 2 and 3, the spring being visible in FIG. 4. One end of the spring 11 bears against a rear wall 201 of the upper housing section 1, and the other end against the rear of a pressure roller lever 12. As shown in FIG. 5, the roller lever 12 has a pressure roller 13 rotatably mounted in the lever which in turn is connected to the head holder 6 by an integral hinge 14 having a thickened end 15 pressed into an upwardly extending projection 16 of the head holder 6. Opposite the end 15 a tab 17 extends from the lever 12 and abuts a pin 18 on the head holder 6 when the roller is not actually engaging tape in a cassette. The force of the pressure spring 11 is therefore transmitted to the head holder through this pin. Preferably, the pressure roller lever and its end and tab, as well as bearing support for the roller 13, are all a unitary plastic molding. As shown most clearly in FIG. 5, the holder 6 is formed generally as an L-shaped lever having an arm 31 on which the magnetic heads 4, 5 are mounted and an arm 32 at whose end a push button 19 is located. For moving the head holder manually from its operating position to the retracted position, the push button 19 extends through and is movable in an opening 20 formed in an end wall of the lower housing section 2.

To permit the magnetic head unit 3 to be locked in the more retracted position, as shown in FIG. 1, the head holder 6 includes a latch arm 28 extending forwardly from a location adjacent the erase head 5 on the arm 31, and having an end 21 arranged to latch against an edge 22 of the upper housing section 1 which extends downwardly from a horizontal lower surface 223 of the section 1. The operation of this latch will be discussed more fully below. For consistency, in this description "downward" refers to the orientation of FIGS. 1 and 5; therefore "downward" movement of elements shown in FIGS. 2-4 appears upward in these bottom views.

Unlocking from the rest position is accomplished by pivoting the head holder 6 downward, in a second direction transverse to its principal movement between the retracted and operating position. To permit these two motions to be properly defined, the upper housing 1 includes an integrally molded bearing pin 25 extending downward near an end wall 225 of the upper section, the pin 25 being a loose fit in a bore 26 of a side projection 27 formed in the head holder 6 adjacent the region where the arms 31 and 32 meet and the projection 16 extends. The holder 6 is thus pivotable about a vertical axis between the operating position shown in FIGS. 2 and 3 and the retracted position; and pivotal about a horizontal axis because of the loose fit between the unlocked and locked position, while retracted.

To bias the holder 6 upward (toward the locking position), a leaf-spring 23 is pressed into and extends forwardly from a boss 24 on the rear wall 201, and presses upwardly against a roller 30 which is fitted rotatively into a groove in the bottom surface of the latch arm 28. Alternatively, of course, the roller could also be mounted at the end of the leaf-spring, and roll along the undersurface of the arm 28, depending on the optimum choice of design details.

The vertical positioning of the holder 6 is established by the cooperation of a number of different surfaces. When the holder is in the locked position, a cam surface 29, disposed on the arm 28 at a slightly different level from the end 21, is pressed against a horizontal surface 33 of the upper housing section 1 extending forwardly from the edge 22. The force exerted by the leaf-spring 23 biases the holder 6 toward the surface 33 described above, and toward the raised surfaces 34 and 35 of two bosses molded into the bottom surface of the upper housing section 1. Surface 34 engages the lever arm 32 near the button end 19, and surface 35 is near the pin 25. This use of three widely separated surfaces provides unambiguous positioning of the holder 6, and therefore of the magnetic head unit 3. During movement between the operating position and the unlocked, retracted position the upper surface of the end 21 of the arm 28 slides along the surface 33, until the end 21 slides past the edge 22 and is pressed upward to the point where the cam 29 engages the surface 33, again providing unambiguous three-point positioning.

As shown in FIG. 1 the upper housing section 1 has a cassette compartment 36 having a bottom 37 through which a slot 38 is formed, the movable cassette support 8 projecting through the slot to provide localized support to the cassette adjacent the recording/playback head. The surfaces 33-35, which position the head holder 6, and the stationary cassette supports 9 being on opposite sides of the bottom wall 37 of the compartment 36, stable relative positioning of the cassette and the magnetic head unit 3 is assured.

The recorder shown in FIG. 1 is particularly adapted for playing a Compact Cassette 7 which is shown above and parallel to the position is occupies in the recorder, what is normally considered the rear of the cassette being toward the front of the recorder. The long front wall of the cassette, not shown in this view and opposite the knock-out tabs 92 which are removed to identify pre-recorded tape, has a set of openings to expose tape running along that front wall for engagement by a pressure roller and by magnetic heads. These cassettes have symmetrical raised portions 190 on the top and bottom surfaces, in which are symmetrically arranged openings 94 through which a drive capstan, to be described later, may be passed, and openings 95 for positioning the cassette housing in the sideways and front-to-back direction.

A depressed area 191 in the bottom 37 of the compartment 36 receives the raised portion 190 on the bottom of the cassette 7. Pins 96 rising perpendicularly from the depressed area 191 through the openings 95 hold the cassette in place against the respective pressures of the pressure roller 13 and heads 4 and 5 as they are advanced through respective openings 97, 98 and 99 in the rear wall of the compartment 36, to pass through the opening in the "front" wall of the cassette. The rear of the top surface of the cassette fits under two diagonal overhanging portions 93 extending from the front of the top surface of the upper housing section 1 adjacent the stationary supports 9, while an opening 101 across part of the front of the compartment 36 provides access to the rear wall of the cassette to aid in removing it from the recorder.

The distance that the head unit 3 can move forward into a cassette in the compartment 36 is limited by a pin 39, at the end of the arm 31, abutting a stop 40 molded into the upper housing section 1, so that rotary position about the pin 25 is also unambiguous.

Drive and Control Mechanisms

In addition to electrical controls not shown, the usual mechanical control functions are provided. For example, one of the knock-out tabs 92 may be removed in order to indicate that the cassette contains pre-recorded tape and it should not be erased, as for recording purposes. As will be described below the recorder has a novel sensing device for detecting that the knock-out has been removed, and that the recorder should thereby be disabled from operating in the recording mode. The recorder mechanism also features a fast re-wind capability, temporary stop capability during recording or playback, and a "quick repeat" feature which enables a user to check rapidly during recording whether or not a signal is actually being recorded on a tape. This last feature enables cost and size reduction by eliminating the need for a meter element which shows that recording is actually being obtained.

The tape transport mechanism is driven by an electric motor 41 having a pulley 42 on its shaft, coupled by a driving belt 79 to drive pulleys 56 and 74.

As shown in FIG. 1, the typical compact cassette 7 has tape hubs 43, 44 arranged to fit over and be driven by respective reel spindles 45, 46. The spindle 45 is formed integrally with a disc 47 and gear wheel 48, and the spindle 46 is correspondingly integral with a disc 49 and gear 50, the gear wheels being visible in the bottom views, FIGS. 2-4. Each of these spindle-disc-gear assemblies is accommodated in a recessed casing 51, 52 formed in the bottom 37 of the cassette compartment 36, and having an opening in the casing side for driving access to the respective gear 48, 50. The spindle-gear combinations are fitted and locked in place on journals, not shown, integral with the casings 51, 52, the journalling being of any of the types well-known in the art. When the recorder is in the Fast Rewind mode, described later, the spindle 46 is driven through the gear wheel 50 by a drive train commencing with the pulley 56, which is made integrally with a large gear 53 that can be moved to engage an intermediate gear wheel 55. The gear 55 is rotatable on a pin 73 integral with the upper housing section 1, and is continuously in mesh with the gear 50. The gear 53 and pulley 56, and a pinion 54 are each rotatably journalled on a spindle 57 suspended from a movable bracket 58 which is part of a movable drive unit 59 having a push button 60 disposed in the opening 20 of the housing section 2, next to the button 19. The bracket 58 and spindle can be one integral plastic molding, or a metal spindle can be pressed into the bracket.

The unit 59 is guided for sliding movement on guide faces 61 and 62 adjacent the end wall 225, the face 62 being at the same level as the surface 34 which guides the support 6, and a surface 63 on the bottom of the casing 52 for the gear wheel 50. From the same surface 63 an arch 64 depends, having an opening 65 therethrough. A guide pin 66 attached to the bracket 58, generally parallel to the front and rear walls of the recorder, fits through the opening 65, a top edge of the guide pin resting on the surface 63. The button 60 at one end of the unit 59 rests on the guide face 62, and a guide portion 67 at the end of an arm 78 of the bracket 58 bears against the guide surface 61.

The bracket 58 is further guided by a block 68 integral with the housing section 1, and having a free end projecting downwardly through a slot 69 in the bracket 58 near the button 60. The guide block has a projecting tab 70 which retains an end of a leaf-spring 71 fitting between the guide block and the button 60, and biasing the button outwardly while pressing the entire drive unit toward the guide surfaces 61, 62, 63. Except when the button 60 is depressed by the user of the recorder, the leaf-spring 71 maintains the button 60 and bracket 58 in the position shown in FIG. 1, in which the pinion 54 is in mesh with the gear wheel 48 for driving the spindle 45. The pinion 54 is at all times coupled to the gear 53 by a friction coupling which may be of any well known type, such as a felt disc and pressure spring, so as to produce a substantially constant torque at the spindle 45 for winding tape on to the hub 43 during recording or playback. A lug 72 is also formed integrally as part of the bracket 58, and extends immediately below the intermediate gear wheel 55, and is arranged to retain the intermediate gear wheel in position on the pin 73 regardless of the position of the unit 59.

Tape speed during recording and playback is controlled by a capstan 75 formed as part of a spindle having a pulley 74 at its lower end, around which the drive belt 79 passes. The capstan spindle is journalled in a metal bearing bushing 77 pressed into a boss 76 formed integrally with the housing section 1. The arm 78 of the bracket 58 extends across the undersurface of the pulley 74 so as to retain the pulley and capstan 75 in their correct axial position.

Selection of the recording function involves a switching member 80 shown in FIGS. 2 and 3, which may also be formed as a plastic molding. The member 80 extends generally parallel to the end wall 225 of the upper housing section 1, between the casing 52 and the motor 41. The member 80 is positioned, so as to allow rotational and longitudinal movement of the member, by a slot 81 through which a downwardly extending pin 82 fits with play, the pin 82 being integral with the housing section 1. At the rear end of the member 80 a locking cam 83 is formed, positioned to cooperate with a locking cam 84 formed at the remote end of the arm 31 of the head support 6. At its other end the member 80 has a recording button 85 located in an opening 86 formed in the front wall of the housing section 1, and adjoining an opening 87 in the bottom 37 of the cassette compartment 36. As shown in FIG. 1, a sensor pin 88 connected to the recording button 85 projects into the cassette compartment 36, for sensing whether or not a pre-recorded cassette has been inserted in the recorder as will be described later. The member 80 is urged rearward within the recorder, so that the button 85 does not protrude beyond the front wall of the housing 1, and simultaneously is biased rotationally about the pin 82 by a tension spring 89 having one end fitted around a pin 90 formed on the member 80, the spring extending obliquely toward the rear of the recorder so as to bias the cam 83 end of the member 80 away from the head holder 6. An actuator rod 91 is pivotably connected to the switching member 80 for operation of an electrical recording switch, not shown, for control of the well-known circuits for the motor drive and recording functions.

To keep the pressure roller 13 from pressing a magnetic tape against the capstan during fast rewind, the drive unit 59 is arranged so that depression of the button 60 will cause the head holder 6 to be rotated slightly, sufficiently to move the pressure roller 13 out of pressure contact holding the tape against the capstan 75. To accomplish this, on the unit 59 to one side of the pushbutton 60 a stop 102 is integrally molded, which cooperates with a forwardly projecting tab 103 formed on the stop button 19. The travel of the button 60 is limited sufficiently that the support 6 does not move to the point where it is fully retracted and the end 21 can latch behind the edge 22. Upon release of the rewind button 60, the leaf-spring 71 returns the drive unit 59 to its original position, and the head holder 6 is rotated to its operating position by the force of the spring 11, until the pin 39 again abuts the stop 40.

Figure 4:
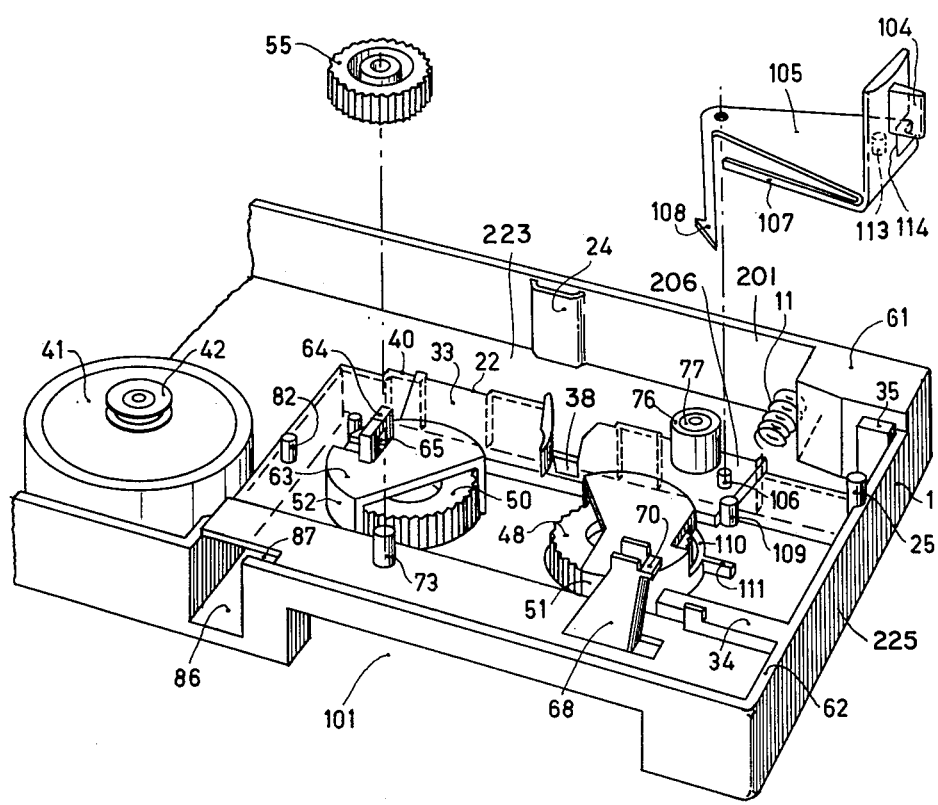
FIG. 4 is a view similar to FIG. 2 but with certain parts omitted.
Figure 5:
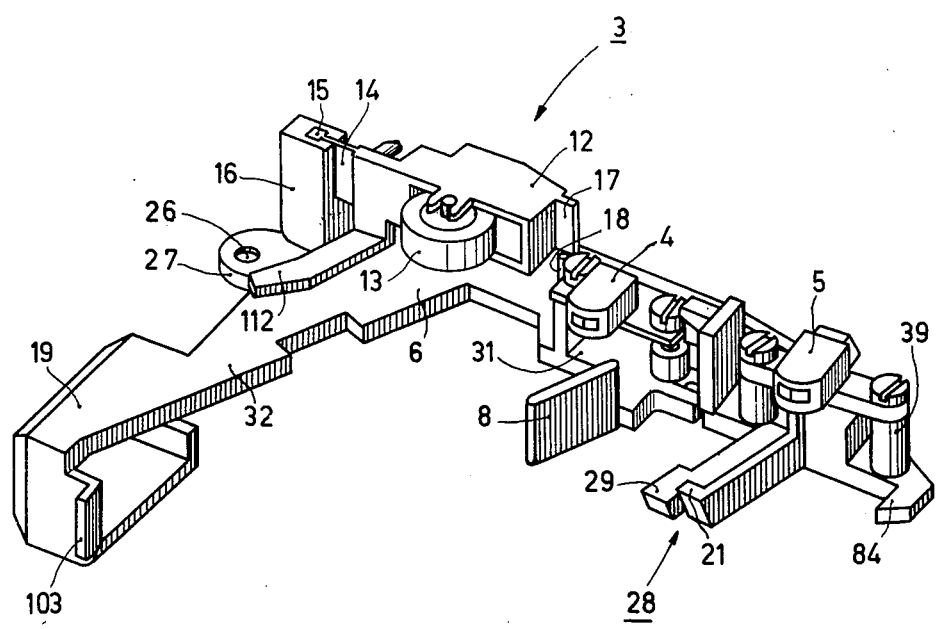
FIG. 5 is a perspective view of the magnetic head unit of the embodiment of FIG. 1.

As shown in FIG. 4, the recorder also includes a pause button 104, formed integrally with a pause lever 105 that is pivotable about a pin 106 projecting downwardly from an undersurface 206 of the upper housing section 1 adjoining the boss 76 for the capstan bearing. The lever 105 includes a button portion which projects through an opening in the end wall of the recorder near the stop button 19, and a leaf-spring 107 extending from the button end of the lever which bears against a stop pin 109 formed integrally with the upper housing section 1, so as to bias the button pivotally toward a disengaged position. At the other end of the lever 105 a hook portion 108 projects away from the pivot pin 106. The lever 105 rides on three contact surfaces arranged at the same level of the upper housing section 1: edge 62 of the housing section, contacted by the button end; surface 206 located on the underside of the compartment 36, contacted by the pivot portion of the lever; and the edge surface 110 of a cut-out portion in the casing 51 and an adjoining guide ridge 111 on which the hook portion 108 contacts. When the pause button is moved toward the front of the recorder, the hook 108 enters the opening in the casing 51 so as to engage the teeth of the gear wheel 48.

As stated above, in the pause position the hook 108 engages the gear wheel 48, and prevents gear rotation so that the drive clutch for the gear 48 slips. To prevent transport of the magnetic tape by the capstan 75, a pin 113 extending downwardly from the lever 105 engages a cam surface on a forwardly extending arm 112 of the pressure roller lever 12 such that movement of the button 104 to the pause position rotates the lever 12 rearward, away from the tape and the capstan 75. Preferably, the cam surface on the arm 112 is so shaped that the pause lever 105 is locked in the pause position, but can be manually returned out of the locked position, the spring 107 then returning and holding the pause lever in its neutral position in which an edge 114 of the lever near the button 104 engages an edge of the projection 27 of the head holder 6. Also, the leaf-spring 23 is so proportioned that the head holder 6 remains in its operating position even though the pause control has rotated the pressure roller lever 12 against the pressure of the spring 11.

Operation

1. Playback

Playback operation is not effected by the presence or absence of the knock-out tabs 92 in the rear wall of a cassette; only the longitudinal position of the member 80 is affected. The following description is based on the use of a cassette from which the relevant knock-out tab has not been removed.

To load a cassette 7 in the recorder, the cassette is first tilted slightly from front to back so that the rear corners of the cassette pass under the overhanging portions 93, while the front edge of the cassette passes over the rear edge of the compartment 36, in which the openings 97–99 are formed. The front edge of the cassette is then brought downward into the compartment 36 so that the capstan 75 passes through the appropriate opening 94 and the locating pins 96 enter the two openings 95, positioning the cassette in the front-to-back direction. At the same time the reel spindles 45, 46 pass through and engage the hubs 43, 44 so that the hubs can be driven.

Free downward movement of the front portion of the cassette is arrested when the lower raised portion 190 contacts the top edge of the movable cassette support 8 which projects above the depressed area 191 and extends a short distance under the portion 190. By exerting pressure on the cassette near its front, the movable cassette support 8 is pushed downward, thereby pivoting the head holder 6 slightly, about an axis which passes through the surfaces 34 and 35 because of the play in the opening 26 between the projection 27 and the bearing pin 25. This downward movement basically affects the arm 31 of the holder 6, so that the latch arm 28 is also moved downward against the pressure of the leaf-spring 23, at least until the end 21 moves beyond the edge 22 and the biasing force of the pressure spring 11 is no longer resisted by the latching action against the edge 22. Under the urging of the spring 11, the entire magnetic head unit 3 now pivots on a vertical axis about the point of contact between the projection 27 and the pin 25, the leaf-spring 23 urging the top surface of the arm 21 against the surface 33. As the magnetic head unit rotates, the cassette support 8 slides along the underside of the cassette 7, and the pressure roller 13 and the magnetic head 4 and 5 pass through the openings formed in the front wall of the casette until the pressure roller 13 presses the magnetic tape in the cassette against the capstan 75. A slight further pivoting of the head holder 6 is provided by the effect of an inclined end 100 on the leaf-spring 23, along which the roller 30 moves so as to press the arm 28 still farther forward. In addition, spring force from the hinge 14 of the pressure roller lever 12 may contribute to the pivoting bias of the holder 6, which continues to move until the pin 39 comes against and abuts the stop 40 molded in the upper housing section. At the same time resilient pressure pads, which are provided in known cassettes of this general type, hold the tape with proper force against the operating faces of the heads 4 and 5. Because the tab 17 of the pressure roller lever 12 is now held free of the stop-pin 18 formed on the arm 31 of the holder 6, the pressure roller 13 may now provide proper transport pressure against the magnetic tape independently of the position of the heads mounted on the arm 31.

Simultaneously with the final stages of movement of the holder 6, a switch (not shown) is actuated so that the motor 41 is energized and the playback electronic circuits are turned on. The hub 43 is then driven by the reel spindle 45 which in turn is driven in succession by the gear wheel 48, the pinion 54, the friction coupling between the large gear 53 and the pinion 54, and the pulley 56 coupled to the large gear 53. At the same time the capstan 75 is driven by the same movement of the belt 79 which passes also around the pulley 74. In this operating mode the gear wheel 55 engages only the gear 50, so that the spindle 46 and hub 44 can rotate freely. Tape is thus drawn from the hub 44 past the heads and the constant speed capstan 75, and is drawn under constant torque onto the take-up reel or hub 43.

2. Recording

The recorder is designed so that the recording mode can be engaged only if the break-out tab 92 in the wall of the cassette, aligned with the pin 88, has not been removed. If such a tab is not present, when the cassette is inserted into the apparatus, the pin 88 will project into the opening thus created, and the button 85 will not project so that the operator cannot manipulate it with his finger. Furthermore, movement of the button to the recording position is impossible because of the engagement by the pin 88 with the side of the knock-out hole.

When a cassette with tab 92 in place is inserted into the recorder, as the rear wall of the cassette passes under the overhang 93 the pin 88 is engaged, and the recording switching member 80 is moved longitudinally forward against the bias of the spring 89, to a point where the button 85 projects beyond the upper housing section 1. Recognition of this condition is aided by making the button 85 of a striking color having strong contrast with the color of the rest of the housing section. When the cassette has been placed in the apparatus, by pressing with one finger against the protruding button 85 the operator of the apparatus can then pivot the member 80 about the pin 82, against the torque of the obliquely arranged spring 89, so as to move the actuator rod 91 and set a switch for the electronics into the recording position. The tab 92 being in place, the sensor pin 88 is thus free to slide over the rear wall of the cassette.

When the head holder 6 has been unlocked and reached its operating position, as described under playback operation, the locking cams 84 and 83 engage so as to hold the member 80 in the recording position shown in FIG. 3.

3. Stopping

Tape transport can be stopped at any time during playback or recording by depressing the button 19 with a finger, thus pivoting the head holder 6 about the bearing pin 25. The button should be depressed so far that the holder 6 moves to its fully retracted position, in which the edge 21 of the latching arm 28 will be pressed upward by the leaf-spring 23 so as to lock behind the edge 22. By this motion of the holder 6, the pressure roller 13 and heads 4 and 5 will have been withdrawn entirely clear of the cassette, after which the locking movement of the holder 6 causes the cassette support 8 to move upward slightly, tilting the cassette slightly. Further tilting and removal of the cassette from the recorder is facilitated by the presence of the opening 101 in the front wall of the cassette compartment.

4. Fast Rewind

Rapid rewinding of the tape while in the playback mode is accomplished by depressing the button 60. Against the pressure of the leaf-spring 71, the entire drive unit 59 is moved sideways, the guide pin 66 sliding in the opening 65 of the arch 64, until the large gear 53 engages the gear 55. This releases engagement of the pinion 54 with the gear 48, so that the spindle 45 and hub 43 are freely rotatable. At the same time, the stop 102 at the side of the button 60 engages the tab 103 on the stop button 19, pivoting the magnetic head unit 3 sufficiently so that pin 18 engages the tab 17 on the roller lever 12, moving the pressure roller 13 out of forceful engagement with the magnetic tape against the capstan 75. The hub 44 and spindle 46 are thus driven in a reverse direction at increased speed by the engagement of the large gear 53 with the smaller gear 55.

At any time desired during the rewinding mode, the rewind button 60 may be released. The leaf-spring 72 then returns the drive unit 59 to the original position, and the head holder 6 pivots to its operating position in which the pin 39 engaggs the stop 40, restoring the playback mode of operation.

5. Quick Repeat

When the presence of a tab 92 in a cassette has permitted operation in the recording mode, fast rewind as described above is accomplished by depression of the button 60 with all of the previously described effects. Further, the movement of the head holder 6 as a result of engagement of the stop 102 and tab 103 moves the locking cam 84 at the end of the arm 31 rearward to such an extent that the corresponding locking cam 83 on the member 80 is disengaged. The torque exerted by the oblique spring 89 then rotates the member 80 out of the recording position to the playback position, the rod 91 switching over the electronics, so that upon release of the button 60 the apparatus will operate in the playback mode. It is thus possible for the operator to reproduce and listen to the material that has just been recorded on the rewound part of the tape.

6. Pause

As described above, the stopping mode not only stops normal transport of the tape, but releases the magnetic head unit 3 from the operating position, and locks it so that the cassette is in position for removal. To permit temporary interruption of playback or recording, without preparing the cassette for removal, the pause button 104 and its associated lever 105 are provided. When the recorder is in the playback or recording mode, the button 104 which protrudes slightly from the recorder may be engaged with one finger and moved toward the front of the recorder. This rotates the lever 105 about the pin 106 against the force of the leaf-spring 107, and causes the hook portion 108 to engage teeth of the gear wheel 48, stopping the gear. At the same time the pin 113 on the pause lever engages the arm 112 formed integrally with the pressure roller lever 12, moving the lever 12 and pressure roller 13 away from the tape in the cassette, against the force of the spring 11. Thus, while the motor and capstan continue to rotate, the clutch connecting the large gear 53 to the pinion 54 will slip, so that no tape transport will occur.

The magnetic head holder 6 will be maintained in the operating position because of the force exerted by the inclined end 100 of the leaf-spring 23 against the roller 30. Upon release of finger pressure on the button 104, the pause lever 105 will remain in the pause position because of the shape provided at the end of the arm 112.

The pause control can be returned to neutral position by simple finger pressure on the button 104, moving it back to the neutral position, thus permitting the gear wheel 48 again to be driven and the pressure roller lever 12 to restore pressure holding the tape in contact with the capstan 75. If, on the other hand, a stopping operation is performed by pressing the button 19 fully inward, the pause lever will again be returned to its neutral position when the head holder 6 moves to its retracted position, and the arm 112 then no longer engages the pin 113. The button 104 is then returned to the neutral position by pivoting of the lever 105 under the influence of the spring 107.

The foregoing description is applicable to the preferred embodiment shown in the drawing. Many alternative embodiments can also advantageously utilize the invention disclosed and claimed herein. For example, rather than having one movable and two stationary cassette supports, three movable cassette supports can be provided as portions of the head holder 6, either formed integrally therewith or provided as members rigidly attached to the support. One or two spring-loaded cassette supports could be connected to the bottom 37 of the compartment 36; and the height of those spring-loaded supports in the operating condition could also be determined by the head holder when it is located in the operating position by the stop members. Further, the unlocking member for the head holder need not be the movable cassette support 8, but may take the form of a pawl mounted resiliently on the head holder, the pawl allowing movement of the magnetic head unit only when it is in a position depressed by the cassette. Of course, rather than having the head holder spring-loaded toward its operating position, it can be biased toward the retracted position, and an operating button can be used to provide force for moving the head holder to and locking it in the operating position.

The bottom of the cassette compartment can itself be eliminated, for example in the sort of apparatus in which the cassette is inserted through a slot. The cassette can then be supported on a plurality of movable cassette supports which may be directly connected through the head holder and which, during movement of the head holder from its retracted to its operating position all slide over the surface of the cassette. The only additional location for the cassette may still be provided by locating pins, extending through the appropriate openings 95.

Many other variations of embodiments will also be within the capability of those skilled in the art, but within the scope of the invention. An alternative offering practical advantages from the standpoint of noise and mechanical wear involves synchronization of the various functional effects of the quick repeat mode. If the push button 60 is not formed integrally with the bracket 58 of the drive unit 59, backlash can be introduced so that the head holder 6 is first moved by engagement of the stop 102 with the tab 103 on the stop button 19, so as to lift the pressure roller 13 from engagement with the tape against the capstan 75 initially; and driving of the gear wheel 48 by the motor 41 can be interrupted by cutting off power to the motor 41, before engaging the fast rewind gears. After the backlash has been taken up and the drive unit 59 has been moved back sufficiently, and the gear wheel 53 has engaged the gear wheel 55, the motor 41 is re-energized. This prevents the chattering noises produced by clashing of the gear teeth.

I claim:

1. A tape recorder for use with a cassette on which magnetic tape is wound between two hubs, comprising:
    a housing section formed as a unitary mass of molded plastic material,
    a magnetic head unit comprising a magnetic head holder and at least one magnetic playback head,
    means for moving magnetic tape in a cassette which has been inserted into the recorder in a direction of tape transport past said at least one head,
    means for mounting the magnetic head unit to the housing section to be movable relative to the section in a first direction between a retracted position in which a cassette can be inserted into or removed from the recorder, and an operating position in which the magnetic head can operatively engage magnetic tape in a cassette which has been inserted into the recorder; and in a second direction transverse to said first direction of movement and transverse to said direction of tape transport, and
    means for supporting a cassette inserted in the recorder so arranged that when the magnetic head unit is in the operating position the position of the cassette is defined relative to the magnetic head, said means for supporting including a movable cassette supporting means integral with said head holder for supporting at least a portion of the cassette adjacent said at least one head, the position of the movable cassette supporting means in said second direction, when the magnetic head unit is in the operating position, being determined by the magnetic head unit, so that upon inserting a cassette into the tape recorder, and movement of the magnetic head unit to the operating position, the position of at least a portion of the cassette in said second direction is determined directly by the position of the magnetic head unit.

2. A recorder as claimed in claim 1 wherein said cassette supporting means also includes two stationary cassette supports, and wherein said movable supporting means includes a single supporting member only, providing localized support adjacent said playback head.

3. A recorder as claimed in claim 2, wherein said housing section includes a cassette compartment having a bottom wall and an opening through which said supporting member protrudes, and said stationary cassette supports are formed by two surfaces formed in said section and raised from said bottom wall remote from each other and from the supporting member.

4. A recorder as claimed in claim 3, wherein the means for mounting the magnetic head unit includes three surfaces of said molded section remote from each other and parallel to said bottom wall, said head holder when in the operating position being located along said second direction against said three surfaces.

5. A recorder as claimed in claim 3, wherein said means for mounting the magnetic head unit includes a pivot bearing having play so as to permit pivoting about two transverse axes, and said magnetic head holder has an arm extending under said bottom wall for positioning said holder about one of said axes.

6. A recorder as claimed in claim 5, wherein said holder is formed as a lever having two arms extending from said pivot bearing; and said magnetic playback head, said supporting member and said arm extending under said bottom wall are all located along a same one of said two arms.

7. A recorder as claimed in claim 2, wherein said means for mounting the magnetic head unit includes a pivot bearing having play so as to permit pivoting about two transverse axes, and stationary stop means for locating said magnetic head unit along said first direction when in the operating position, movement in said first direction being a pivoting movement about one of said axes.

8. A recorder as claimed in claim 7, wherein said housing section includes a cassette compartment having a bottom wall and an opening through which said supporting member protrudes, said stationary cassette supports are formed by two surfaces of said molded section raised from said bottom wall remote from each other and from the supporting member, and said stop means includes a stop surface formed in said section adjacent said cassette compartment.

9. A tape recorder for use with a cassette on which magnetic tape is wound between two hubs, comprising:
a housing section formed as a unitary mass of molded plastic material,
a magnetic head unit comprising a magnetic head holder and at least one magnetic head,
means for moving magnetic tape in a cassette which has been inserted into the recorder in a direction of tape transport past said at least one head,
means for mounting the magnetic head unit to the housing section to be movable relative to the section in a first direction between an operating position in which the magnetic head can operatively engage magnetic tape in a cassette which has been inserted in the recorder, and a retracted position in which a cassette can be inserted into or removed from the recorder, and while in the retracted position to be movable in a second direction transverse to the first direction and transverse to said tape transport direction between an unlocked retracted and a locked retracted position,
means for locking the magnetic head holder while in the locked retracted position against movement in the first direction toward the operating position,
means for supporting a cassette inserted in the tape recorder including a movable supporting means integral with said head holder movable in the second direction such that upon movement of the magnetic head to the operating position the position of the cassette is defined relative to the magnetic head,
first resilient means for biasing the magnetic head holder along said first direction toward the operating position, and means for manually moving the magnetic head holder in opposition to said first resilient means from the operating position to the retracted position, and
second resilient means for biasing the magnetic head holder along said second direction toward the locked position, and means for pressing the magnetic head support from the locked toward the unlocked retracted position in opposition to said second resilient means.

10. A recorder as claimed in claim 9, wherein said recorder includes a tape drive capstan arranged to engage tape in a cassette loaded in the recorder, and said magnetic head unit includes a pressure roller lever pivotally mounted to said head holder and a pressure roller rotatably mounted on said lever; said first resilient means bears against said pressure roller lever so that, said magnetic head unit being in the operating position, the force of the first resilient means provides operative engagement of the pressure roller against magnetic tape in the cassette to pinch the tape between the roller and the capstan.

11. A recorder as claimed in claim 10, wherein said second resilient means includes a spring which engages a portion of the head holder, so arranged that when the head holder is in the operating position the spring applies biasing force in a direction also holding the head holder in the operating position.

12. A recorder as claimed in claim 9, wherein said movable cassette supporting means includes a support member arranged to support at least a portion of a cassette loaded in the recorder, said member forming at least part of said means for pressing so arranged that the exertion of manual pressure on said portion of a cassette placed in the recorder will move the head holder from the locked to the unlocked retracted position as insertion of the cassette is completed.

13. A recorder as claimed in claim 12, wherein said means for locking includes a latching element rigidly connected to said head holder and a surface formed in the housing section arranged for abutting engagement by said element when the head holder is in the locked position, and said second resilient means bears against said latching element.

14. A recorder as claimed in claim 13, wherein said latching element and said second resilient means are so arranged that, said head unit being in the operating position, the second resilient means applies biasing force in a direction also holding said head holder in the operating position.

15. A recorder as claimed in claim 12, wherein said means for manually moving the magnetic head holder is an actuating member movable through an opening in a wall of the recorder housing, said holder member, movable head support and actuating member being one integral mass of material.

16. A recorder as claimed in claim 15, wherein said head holder is formed as a lever having first and second arms extending from a pivot, at least one magnetic head being a playback head mounted on said first arm, said support member being formed on said first arm adjacent said playback head, and said actuating member being formed on said second arm,
said lever is pivotally mounted with play to said housing section for motion about a first axis in which the magnetic head moves along said first direction, depression of said actuating member moving the magnetic head unit from the operating to the retracted position; and about a second axis transverse to the first axis in which the actuating member undergoes only a substantially pivoting movement; and
said means for locking includes a latching element formed as part of said first arm, pivoting about said second axis so as to move said element into and out of abutting engagement with a latching surface formed on said housing section.

* * * * *

UNITED STATES PATENT AND TRADEMARK OFFICE
CERTIFICATE OF CORRECTION

PATENT NO. : 4,127,883
DATED : November 28, 1978
INVENTOR(S) : GILBERT E. MESTDAGH It is certified that error appears in the above-identified patent and that said Letters Patent are hereby corrected as shown below:

Col. 1, line 25, change "3,396,899" to --3,394,899--

Signed and Sealed this

Twenty-seventh Day of May 1980

[SEAL]

Attest:

SIDNEY A. DIAMOND

Attesting Officer

Commissioner of Patents and Trademarks